United States Patent [19]

Sugitani et al.

[11] 4,394,670

[45] Jul. 19, 1983

[54] INK JET HEAD AND METHOD FOR FABRICATION THEREOF

[75] Inventors: Hiroshi Sugitani, Machida; Hiroto Matsuda, Yokohama; Koichi Kimura, Yamanashi; Masami Ikeda, Chiba, all of Japan

[73] Assignee: Canon Kabushiki Kaisha, Tokyo, Japan

[21] Appl. No.: 335,466

[22] Filed: Dec. 29, 1981

[30] Foreign Application Priority Data

| | | | |
|---|---|---|---|
| Jan. 9, 1981 | [JP] | Japan | 56-1856 |
| Jan. 19, 1981 | [JP] | Japan | 56-94651 |
| Jun. 19, 1981 | [JP] | Japan | 56-94654 |

[51] Int. Cl.³ .............................. G01D 15/18

[52] U.S. Cl. .............................. 346/140 R

[58] Field of Search .............. 346/140, 75; 400/126

[56] References Cited

U.S. PATENT DOCUMENTS

| | | | |
|---|---|---|---|
| 4,243,994 | 1/1981 | Kobayashi | 346/140 R |
| 4,330,787 | 5/1982 | Sato | 346/140 R |

*Primary Examiner*—Joseph W. Hartary

*Attorney, Agent, or Firm*—Fitzpatrick, Cella, Harper & Scinto

[57] ABSTRACT

An ink jet head comprises an ink flow path formed by laminating cured films or photosensitive compositions and an ink discharging orifice, at least the ink discharging orifice region being composed of the cured films. A method for fabrication of an ink-jet head comprises forming a first film of a cured photosensitive resin on a surface of a substrate on which an ink discharge pressure generating element is arranged, produced an ink flow path with a second film of a cured photosensitive resin formed on the first film, further disposing a third film of a cured photosensitive resin on the second film, and forming an ink discharging orifice connected to the ink flow path, with the said first, second and third films of cured photosensitive resins.

19 Claims, 18 Drawing Figures

INK JET HEAD AND METHOD FOR FABRICATION THEREOF

BACKGROUND OF THE INVENTION

1. Field of the Invention

The present invention relates to an ink-jet head and, more particularly, to an ink-jet head used for generating droplets of ink for a so-called "ink-jet recording system", and further relates to a method for fabrication thereof.

2. Description of the Prior Art

An ink-jet head which is adopted in ink-jet recording systems is generally provided with a fine ink discharging port (or orifice), an ink flow path, and elements for generating an ink discharging pressure arranged in the ink flow path. Heretofore, there have been known various methods for fabricating ink-jet heads, for example, a method comprising shaping fine grooves on a plate of glass or metal by cutting or etching and then bonding or pressing the plate thus processed to another appropriate plate to form ink flow paths.

Ink-jet heads produced by the conventional methods suffer from the following drawbacks. An ink flow path having a constant resistance to ink flowing is difficult to obtain due to roughness of the interior wall surface of the ink flow path when it is fabricated by cutting, or due to nonuniform flow paths which are formed due to the difference in the etching rate. Consequently, ink-jet properties of the resulting ink-jet head would be varied.

Also in the cutting process, the plate is liable to be broken or cracked resulting in lowering of the production yield, and in the etching process many steps are disadvantageously required resulting in a high production cost. In addition, the above mentioned conventional methods suffer from drawbacks such as positioning of a grooved plate and a lid plate provided with a driving element, generating energy for actuating the ink such as a piezoelectric element, an exothermic element and the like, is very difficult resulting in a low rate of mass production. The ink-jet head according to the aforesaid known process has a critical drawback such as straight driving of ink droplets is hindered. This drawback mostly results from a difference in absorbability of materials of which the ink-jet head nozzle is composed.

Heretofore, in order to remove these drawbacks it has been proposed that an orifice plate made of a homogeneous material is separately formed and is assembled with a head-body. This process, however, disadvantageously requires adhesives, which are liable to flow into fine ink nozzles or fine ink flow paths. This results in clogging of the nozzles which deteriorates the ink-jet head.

SUMMARY OF THE INVENTION

It is a principal object of the present invention to overcome the foregoing drawback and provide an ink-jet head having superior properties.

It is another object of the present invention to provide an ink-jet head having improved ink ejecting properties, particularly straight driving of ejected ink droplets.

It is still another object of the present invention to provide an ink-jet head which is precise in construction and high in operating reliability.

It is a further object of the present invention to provide an ink-jet head having an ink flow path which is formed with accuracy and is precisely processed in accordance with a design.

It is a still further object of the present invention to provide an ink-jet head which can be manufactured readily with a simple process, and which comprises a multi-orifice type ink-jet head having excellent durability.

According to one aspect of the present invention, there is provided an ink-jet head which comprises an ink flow path formed by laminating cured films of photosensitive compositions and an ink discharging orifice, with at least the ink discharging orifice region being composed of the cured films.

According to another aspect of the present invention, there is provided a method for the fabrication of an ink-jet head which comprises forming a first film of a cured photosensitive resin on a surface of a substrate on which an ink discharge pressure generating element is arranged, producing an ink flow path with a second film of a cured photosensitive resin formed on the first film, further disposing a third film of a cured photosensitive resin on the second film, and forming an ink discharging orifice connected to the ink flow path, with the said first, second and third films of cured photosensitive resins.

DESCRIPTION OF THE PREFERRED EMBODIMENTS

The present invention will be illustrated in reference to the accompanied drawings.

FIGS. 1–10 schematically show an embodiment and fabrication steps of the ink-jet head of the present invention.

Figure 1:
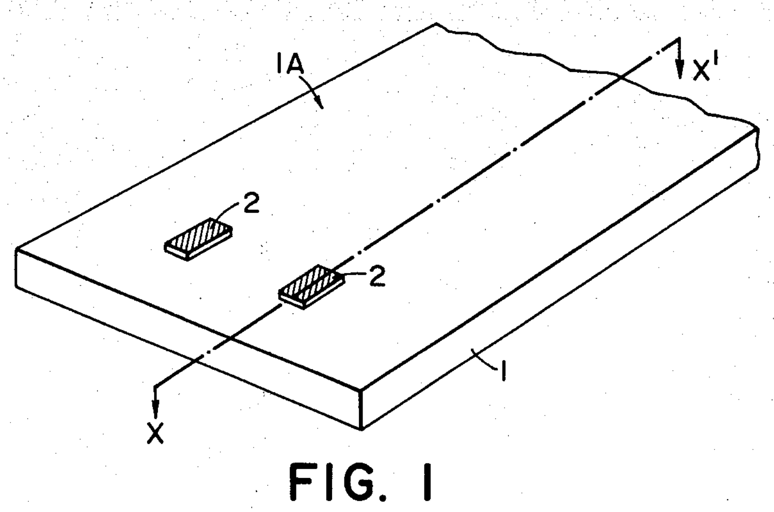
FIGS. 1–18 show embodiments of the steps for forming the ink-jet head of the present invention.

Referring to FIG. 1, a schematical oblique view, a desired number of elements 2 capable of generating an ink discharging pressure such as exothermic element, piezoelectric element and the like, are mounted on an appropriate substrate 1 made of glass, ceramics, plastics, metals, or the like (in the figure two pieces of the element are shown). When an exothermic element is used as the ink discharging pressure generating element 2, the ink discharging pressure is generated by heating the ink in the vicinity of the element. When a piezoelectric element is used, the ink discharging pressure is produced by mechanical vibration of the element.

Incidentally, it is to be understood that the electrode for signal input is connected to this element 2 though it is not shown in the drawing.

Figure 2:
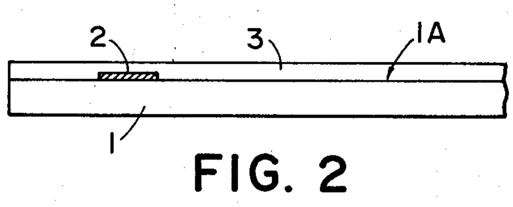
Figure 3:
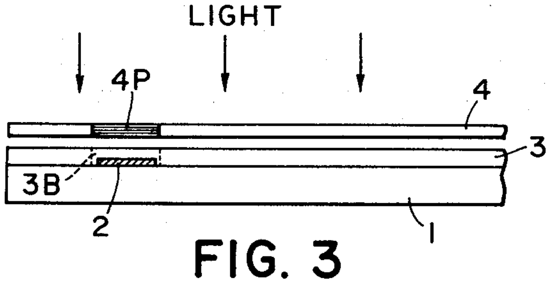

Subsequently, after cleaning and drying the surface of the substrate 1 on which the ink discharging pressure generating elements 2 have been provided, a dry film photoresist 3 of about 25–100$\mu$ in thickness heated to a temperature of about 80°–105° C. is laminated onto the substrate surface 1A at a rate of 0.5–4 feet/minute, under a pressure of 1–3 kg/cm$^2$, as shown in FIG. 2 which is a cross-sectional view taken along line X—X′ of FIG. 1. Thus, the dry film photoresist 3 is firmly adhered under pressure to the substrate surface 1A, and after fixing, it does not exfoliate from the surface even when an external pressure is applied thereto to some extent. Thereafter, as shown in FIG. 3, a photomask 4 having a predetermined pattern 4P is placed on the dry film photoresist 3 provided on the surface of the substrate 1 and exposed to light through photomask 4 as shown by the arrow. The pattern 4P fully covers a region corresponding to the ink discharging pressure generating element 2, and does not transmit light therethrough. Therefore, the dry film photoresist 3 of the region covered with the pattern 4P is not exposed to light. In this instance, it is necessary that the position of the discharging pressure generating element 2 and the position of the pattern 4P are aligned by a conventional method. In other words, care should be taken, at least, to dispose the element in the fine ink flow path to be formed subsequently.

On exposing the dry film photoresist 3, the photoresist 3 outside the region of the pattern 4P is polymerized to cure and becomes insoluble in a solvent while an unexposed part of the photoresist, shown as a region 3B between the dotted lines in the Figure, is not cured and remains soluble in a solvent.

Figure 4:
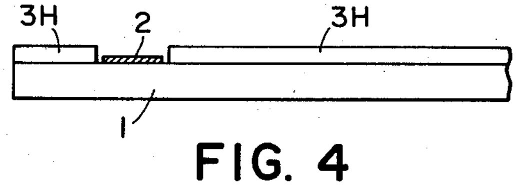

Subsequent to the above-mentioned exposing process, the dry film photoresist 3 is immersed in a volatile organic solvent, e.g., trichloroethane, to dissolve and remove the unpolymerized (uncured) photoresist, whereupon a cured photoresist film 3H is formed in a region excluding a region of ink discharging pressure generating element 2 (FIG. 4). Thereafter, this cured photoresist film 3H remained on the substrate 1 is further subjected to a curing treatment in order to improve the solvent-resistant properties. Such curing treatment may be done by a thermal polymerization (heating at a temperature of 130°–160° C. for about 10–60 minutes), or ultraviolet ray irradiation, or combination of these two treatments.

Figure 5:
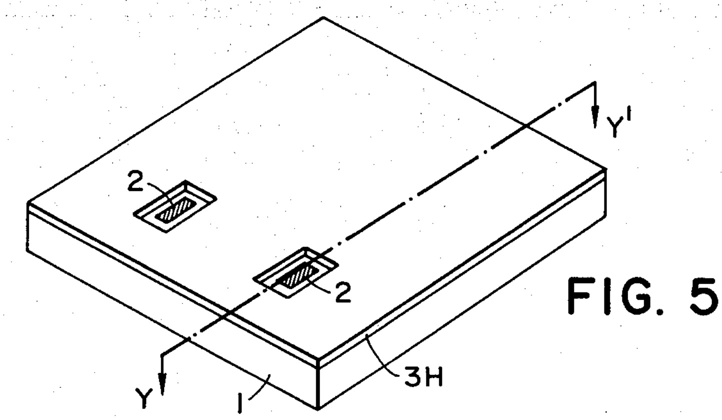
Figure 6:
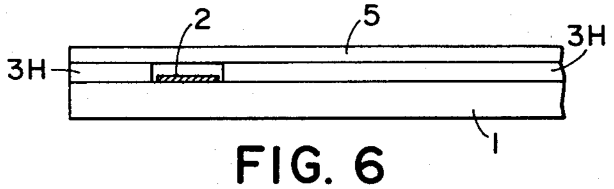

FIG. 5 illustrates a perspective view of an intermediate fabricated product in accordance with the above-mentioned method. Then, after cleaning and drying a photoresist film surface 3H of the intermediate product shown in FIG. 5 a dry film photoresist 5 of approximately 25–100μ thick is heated to a temperature of 80°–105° C. and is laminated on the cured photoresist film surface 3H at a rate of 0.5–4 feet/min., and under a pressure of 1–3 kg/cm$^2$ by a procedure similar to the previously mentioned one (FIG. 6). FIG. 6 illustrates a cross-sectional view taken along a line Y–Y′ of FIG. 5. In this step, when the dry film photoresist 5 is further laminated on the cured resist film surface 3H, a care should be taken to prevent the photoresist 5 from flowing into an opening the above ink discharge pressure generating element 2. Accordingly, a laminating pressure to be applied must be controlled to be below 0.1 kg/cm$^2$ in order to prevent the photoresist from flowing into the opening.

Alternatively, a photoresist 5 is pressed onto a cured film 3H keeping a clearance corresponding to the thickness of the film 3H in order to eliminate an excess pressure applied to film 3H. In such a manner, a dry film photoresist 5 is fixed by pressing and does not exfoliate from the surface even when an external pressure is applied thereto to some extent.

Figure 7:
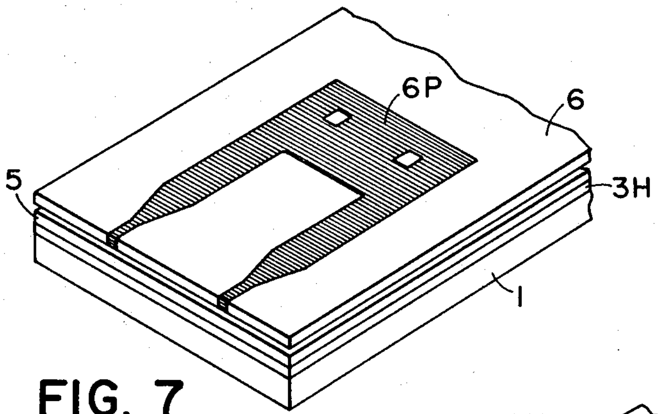

Subsequently, as shown in FIG. 7, after placing a photomask 6 having an appropriate pattern 6P on the dry film photoresist 5 provided on the substrate, the resist is then exposed to light through the photomask 6. The said pattern 6P corresponds to a region constituting an ink feeding chamber, ink flow paths, and ink discharging orifice to be finally formed. This pattern 6P does not transmit light therethrough. Therefore, the dry film photoresist 5 at the region covered with the pattern 6P is not exposed to light. In this instance, it is necessary that the position of the ink discharging pressure generating element is aligned with that of pattern 6P by a known method. In other words, care should be taken, at least, to position the element 2 in the portion of the fine ink flow path.

Figure 8:
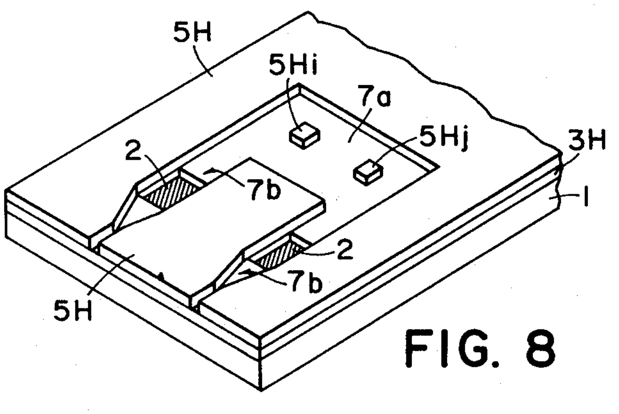

As disclosed above, when the photoresist 5 outside the region of the pattern 6P is exposed to light, the photoresist is cured by polymerization and becomes solvent-insoluble while the photoresist 5 which has not been exposed is not cured and remains solvent-soluble. After the exposing process, the dry film photoresist 5 is immersed in a volatile organic solvent, e.g., trichloroethane, to dissolve and remove the unreacted (uncured) photoresist, whereupon a concave part is formed, as shown in FIG. 8, in the cured photoresist film 5H following the pattern 6P. Thereafter, the cured photoresist film 5H remaining on the resist film 3H is further subjected to a curing treatment in order to increase solvent-resistive properties. Such a further curing treatment may be done by subjecting the photoresist film to a thermal polymerization at a temperature of 130°–160° C. for 10–60 minutes, or to ultraviolet ray irradiation, or to combination of these two treatments. Of the recessed parts formed in the cured photoresist film 5, the part *7a* corresponds to the ink feeding chamber of the finished ink-jet head while the part *7b* corresponds to the fine ink flow path.

Two remaining portions, so-called "islands" 5Hi and 5Hj in an ink flow path *7a* in FIG. 8, are utilized as supports for holding a ceiling board so as not to hang it down into the ink feeding chamber. The support may be freely designed, configurationally and dimensionally, unless ink flow will be disturbed.

Figure 9:
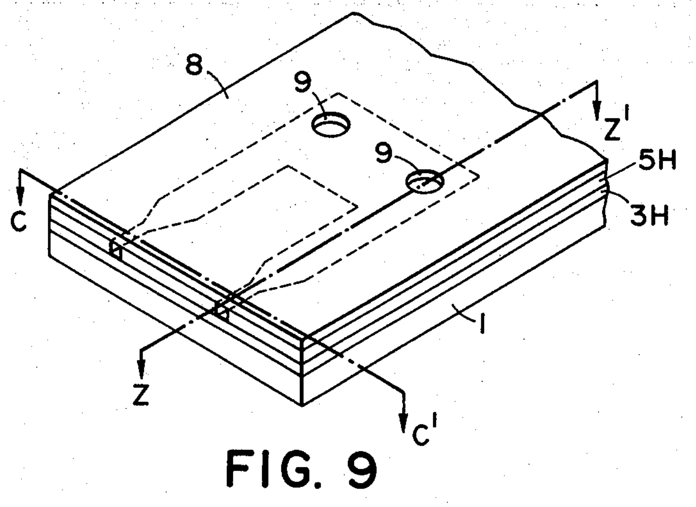

Referring to FIG. 9 for the purpose of constituting a ceiling board a dry film photoresist 8 is further bonded to the surface of the cured photoresist film 5H in which ink flow paths have been formed. The conditions for the above are substantially the same as the laminating condition of photoresist 5.

Subsequently, a photoresist 8 is cured according to a similar exposing and developing process to the previously disclosed one and a desired number of connecting ports 9 to the ink flow paths is formed. The conditions thereof are substantially the same as those previously explained.

Figure 10:
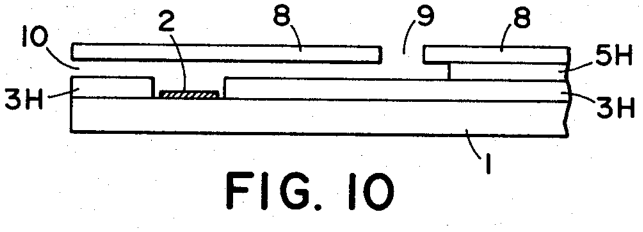

As stated above, after completion of joining the cured film 5H and dry film photoresist 8 which has been thus cured, the tip end part is cut along a line C—C′ in FIG. 9. This cutting is effected to optimize the distance between the ink discharging pressure generating element 2 and the ink discharging orifice 10 as shown in FIG. 10. The region to be cut out is arbitrarily determined in accordance with the design of the ink-jet head. For the cutting operation, a dicing method usually adopted in semiconductor industry may be employed.

FIG. 10 is a longitudinal cross-section taken along a line Z—Z′, in FIG. 9. The cut surface is smoothed by polishing, and an ink tank (not shown) is directly connected to the member through an opening 9 or an ink feeding pipe (not shown) is attached to the opening 9 so as to connect to an ink tank to complete an ink-jet head.

Another embodiment of the present invention is illustrated in FIGS. 1, 2 and 11–18 concerning the construction and fabrication.

Referring to FIG. 1, a desired number of elements (two pieces of the element are shown in FIG. 1) which generate ink discharging pressure, such as exothermic element, piezoelectric element and the like, arranged on a substrate 1 made of glass, ceramics, plastics, metals or the like.

For example, when an exothermic element is used as the ink discharging pressure generating element 2, the ink discharging pressure is generated by the element which heats the ink in its vicinity. On the other hand when the piezoelectric element is used, the ink discharging pressure is generated by the element which causes a mechanical vibration. In actual practice, these elements 2 are connected to electrodes for signal input (not shown) as a matter of convenience for explanation.

Subsequently, after cleaning and drying the surface of the substrate 1, on which the ink discharging pressure generating element 2 has been provided, a dry film photoresist 3 having a film thickness of approximately 25–100μ and heated to a temperature of 80°–105° C., is laminated on the surface 1A of the substrate at a rate of 0.5–4 feet/min. and under a pressure of 1–3 kg/cm$^2$ as shown in FIG. 2. FIG. 2 is a cross-sectional view taken along a line X—X' in FIG. 1.

The dry film photoresist 3 is firmly adhered under pressure to the surface 1A of the substrate, and after its fixing, does not exfoliate from the surface even when an external pressure is applied thereto to some extent.

Figure 11:
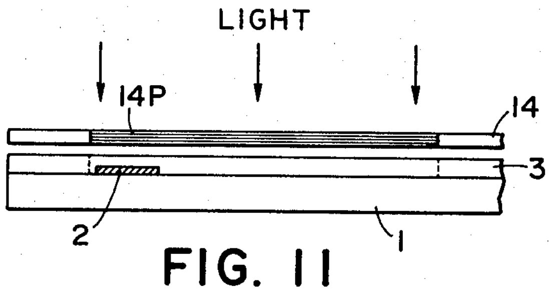
Figure 12:
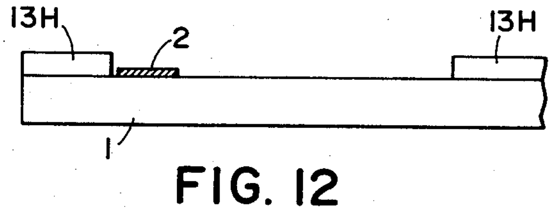

Subsequently, as shown in FIG. 11, a photomask 14 having a pattern 14P is overlaid on the dry film photoresist 3 provided on the surface 1A of the substrate, and light exposure is effected over the photomask 14 as shown by the arrow. The pattern 14P fully covers the regions corresponding to an ink discharging pressure generating element 2 and an ink feeding chamber, ink flow paths to be formed later. The pattern 14P does not transmit light therethrough. Therefore, the dry film photoresist 3 of the region covered with the pattern 14P is not exposed to light. In this case, it is necessary that the positions of the ink discharging pressure generating element 2 and the abovementioned pattern 14P should be aligned by a known method. In other words, care should be taken, at least, to position the element 2 so as to be exposed (not covered) in the portion of the fine ink flow path.

Upon exposure of the dry film photoresist as mentioned above, the photoresist 3 outside the region of the pattern 14P is cured by polymerization caused by the light and becomes insoluble in a solvent while the unexposed photoresist 3 existing between the broken lines is not cured and remains soluble in the solvent. After the exposure step, the dry film photoresist 3 is immersed in a volatile organic solvent, e.g., trichloroethane, to dissolve and remove the unreacted (uncured) photoresist. As a result, a cured photoresist film 13H is formed on substrate 1 at a region except that corresponding to pattern 14P as shown in FIG. 11 (refer to FIG. 12). Then, the cured photoresist film 13H remaining on substrate 1 is further subjected to curing treatment in order to improve the solvent-resistance. Such treatment may be done by subjecting the photoresist film 13H to thermal polymerization at 130°–160° C. for approximately 10–60 minutes, to ultraviolet ray irradiation, or to combination of these two treatments.

Figure 13:
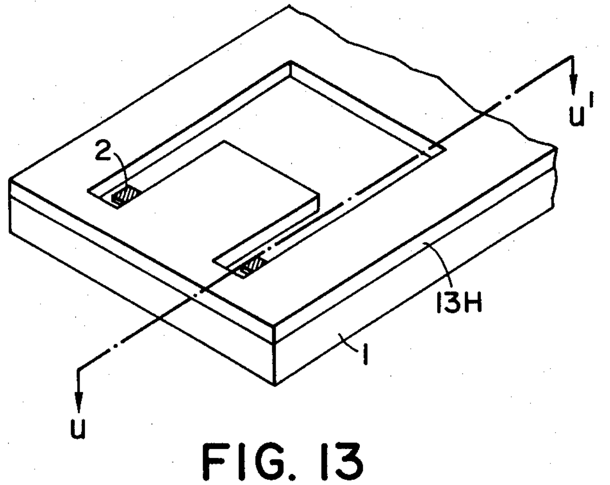

An aspect of the intermediate product prepared as above is shown in FIG. 13 as a perspective view.

Figure 14:
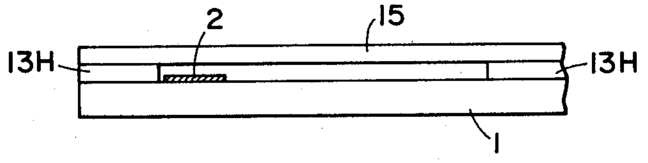

After cleaning and drying the surface of the cured photoresist film 13H of the intermediate shown in FIG. 13, a dry film photoresist 15 of approximately 25–100μ thick heated to approximately 80°–105° C. is laminated to the surface of the film 13H at a rate of 0.5–4 feet/min. under a pressure of not more than 0.1 kg/cm$^2$, as previously proceeded (FIG. 14). FIG. 14 is a cross-sectional view taken aong a line U—U' in FIG. 13. In this step, a care should be taken to prohibit a cured photoresist 15 from hanging down into a concavity formed in the photoresist film 13H according to the aforesaid steps when the further dry film photoresist is laminated onto the cured resist film 13H. Accordingly, a pressure of the lamination is controlled so as not to be higher than 0.1 kg/cm$^2$.

Figure 15:
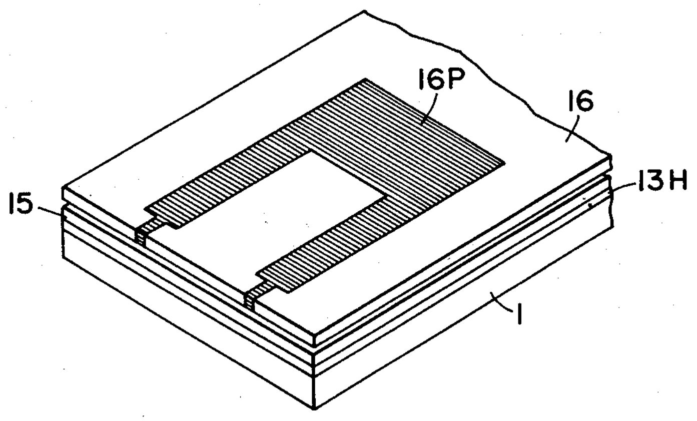
Figure 16:
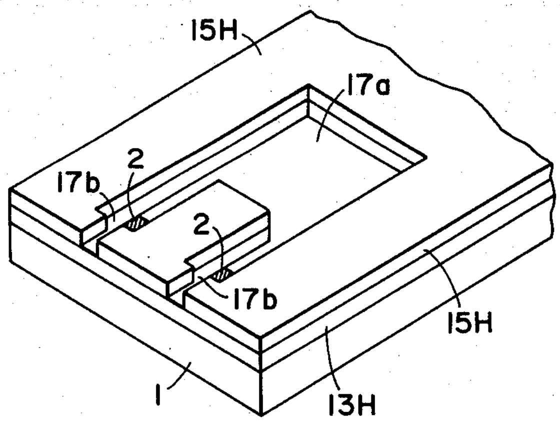

Alternatively, on laminating a further dry film photoresist to a previously cured resist surface, the dry film photoresist 15 may be pressed onto the said cured film 13H keeping a clearance corresponding to the thickness of the said cured film 13H. In such a process, the dry film photoresist 15 is firmly pressed and fixed to the surface of the cured film 13H and after its fixing the dry film photoresist 15 does not exfoliate from the surface even when an external pressure is applied thereto to some extent. Subsequently, as shown in FIG. 15, a photomask 16 having a desired pattern 16P is overlaid on an additional dry film photoresist 15 and light exposure is effected over the photomask 16.

The pattern 16P corresponds to a region to constitute ink feeding chamber, ink flow path and ink discharging orifice to be formed finally, and does not transmit light therethrough. Therefore, the dry film photoresist 15 of the region covered with the pattern 16P is not exposed to a light. It is necessary that the position of the ink discharging pressure generating element 2 provided on the substrate (not shown) and the abovementioned pattern 16 should be aligned by a known method. In other words, care should be taken, at least, to position the said element 2 in the portion of the fine ink flow path to be formed thereafter.

Upon exposure of the dry film photoresist 15 to light, the photoresist 15 outside the region of the pattern 16P is subjected to polymerization to cure and becomes solvent-insoluble while the photoresist not exposed to light is uncured and remains solvent-soluble after the exposure step, the dry film photoresist 15 is immersed in a volatile organic solvent, e.g., trichloroethane, to dissolve and remove the unreacted (uncured) photoresist, to form recesses 17*a* and 17*b* (in FIG. 16) in the cured photoresist film 15H following the pattern 16P. Thereafter, the cured photoresist film 15H remaining on the previously formed resist film 13H is further subjected to curing treatment in order to improve the solvent-resistance. The said treatment may be done by subjecting the photoresist film 15H to thermal polymerization at a temperature of 130°–160° C. for approximately 10–60 minutes, to ultraviolet ray irradiation, or to combination thereof.

The recess 17*a* formed in the cured photoresist film 15H according to the above steps corresponds to an ink feeding chamber while the recess 17*b* corresponds to a fine ink flow path. Then, a dry film photoresist 18 to be a ceiling plate is adhered to the surface of the cured photoresist film 15H provided with ink flow paths (FIG. 17).

The detailed conditions of lamination therefor is substantially the same as those for dry film photoresist 15.

The photoresist 18 is then cured with a similar technique for light exposing and developing the resin, and there is formed a desired number of openings for connecting ink flow paths of the ink-jet head to an ink feeding tank (not shown). The conditions required in this step are omitted here since they are almost the same as those already explained.

Figure 17:
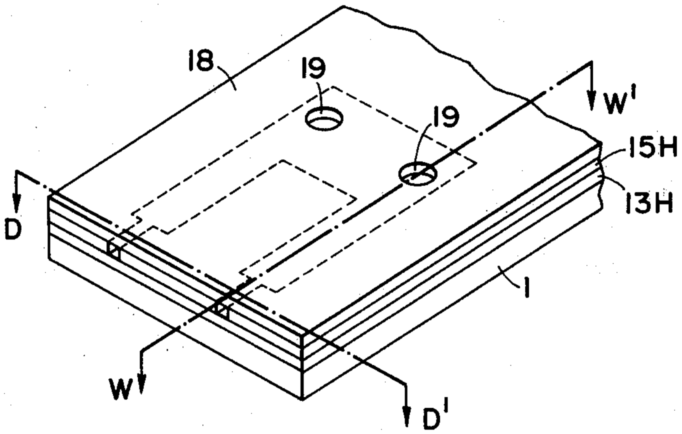
Figure 18:
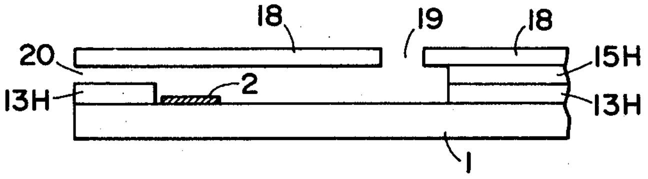

As stated above, after completion of bonding the cured dry film photoresist 18 to the previously cured film 15H, the tip end part of the head is cut along a line D—D' in FIG. 17. This cutting is effected to optimize the distance between the ink discharging pressure generating element 2 and the ink discharging orifice 20. The region to be cut is arbitrarily determined in accordance with a design of the ink jet head. For cutting operation, a dicing usually utilized in a semiconductor industry may be applied. FIG. 18 shows a cross-sectional view taken along a line W—W' in FIG. 17. As shown in FIG. 18, the cut end is smoothed by polishing and through-holes 19 are directly connected to the ink feeding tank (not shown) or to the ink feeding pipe (not shown), whereby the ink jet head is completed.

In the above-described embodiment, a photoresist of a dry film type, that is, performed solid film, is used as the photosensitive composition for forming grooves. It should, however, be noted that the present invention is not limited to such material, but a liquid type photosensitive material may be also utilized. As a forming method of the photosensitive composition film, a composition film in a liquid state may be formed on the substrate by a squeezing method which is used for producing a relief picture image, i.e., a method wherein a wall of the same height as that of the desired film thickness of the photosensitive composition is provided around the substrate, and excess composition is removed by squeezing. In this case, viscosity of the liquid photosensitive composition is preferably 100–300 cps. It is necessary that the height of the wall surrounding the substrate is determined in consideration of decreasing amount of the composition due to solvent evaporation. In the case of solid photosensitive composition, the film of the composition may be adhered onto the substrate by hot-pressing. In the present invention, a solid film-type photoresistive composition is more advantageous in consideration of handling and easy and precise controlling of thickness thereof. Examples of such solid photosensitive composition are those manufactured and sold by Du Pont de Nemour & Co. under tradenames of Permanent Photopolymer Coating "RISTON", Solder mask 730S, 740S, 730FR, 740FR, SM1 and the like. Beside these, there may be enumerated various kinds of photosensitive composition used in the field of ordinary photolithography such as photosensitive resins, photoresist, and the like. These are for example, diazo-resin; photosensitive photopolymers composed of p-diazoquinone, a vinylmonomer, and a polymerization initiator; dimerization type photopolymers composed of polyvinyl cinnamate, etc. and a sensitizing agent; a mixture of o-naphthoquinone diazide and Novolac type phenolic resin; a mixture of polyvinyl alcohol and a diazo resin; polyether type photopolymers prepared by copolymerization of 4-glycidylethylene oxide with benzophenone, glycidylchalocone, or the like; copolymer of N,N-dimethyl methacryl amide and, for example, acrylamide benzophenone; unsaturated polyester type photosensitive resins such as APR (product of Asahi Kasei Kogyo K. K., Japan), TEBISUTA (product of Teijin K. K., Japan), SONNE (product of Kansai Paint K. K., Japan), and the like, unsaturated urethane oligomer type photosensitive resins; photosensitive compositions composed of a bifunctional acrylic monomer, a photopolymerization initiator and a polymer; dichromate type photoresist; non-chromium type water-soluble photoresist; polyvinyl cinnamate type photo-resists; cyclized rubber-azide type photoresist, and the like. The advantages of the present invention as described above may be summarized as shown below.

(1) Since the materials constituting the ink discharging orifice are homogeneous and there is less difference in the absorbibility of the materials, the straight driving of ink droplets is improved.

The "homogeneous materials" here and below may mean "similar type of materials", in particular, "similar type of materials having a similar affinity to ink". For example, glass and resin, metal and resin, or glass and metal, are, in general, dissimilar type of materials in the above mentioned meaning while, for example, one photosensitive resin and another photosensitive resin are usually a similar type of materials.

(2) Since the materials constituting the ink discharging orifice region, e.g., the surrounding or perimeter of the orifice, are homogeneous, the properties thereof are uniform enough to cut easily without causing splitting and cracking upon forming the orifice surface. In addition, physical properties at the orifice region is so uniform that the straight driving of ink droplets is improved.

(3) Since the materials constituting a discharging orifice are physically homogeneous, the processing conditions may be optionally adopted to set the distance between the ink discharging orifice and the ink discharge pressure generating element, and a uniform smooth orifice surface can be obtained after cutting. Therefore, according to the present invention, the ink ejecting characteristics are remarkably stable.

(4) As shown in the first embodiment, the member is covered with photosensitive resin films except the ink discharging pressure generating element and thereby the ink does not contact the other portions (i.e. minimizing the ink contacting portions) resulting in prevention against corrosion to electrodes for electric signal input by the ink and prevention against the breaking of a wire. As a result, life of the head is prolonged and reliability of the head is improved.

(5) Since the main process steps in the fabrication of the ink-jet head rely on a so-called photographic technique, highly precise and delicate portions in the head can be very simply formed according to a desired pattern. In addition, multiple heads having identical constructions may be processed simultaneously.

(6) Since it is not necessary to bond an orifice plate separately prepared. Therefore, adhesions for bonding are not necessary. As a result, there is no fear that adhesives flow into the ink flow paths to clog the paths and disturb the ink flow.

Furthermore, since adhesives are substantially unnecessary in the fabrication steps, there occurs neither clogging of the grooves due to flow of the adhesives thereinto, nor lowering the operating function of the ink discharging pressure generating element due to attaching of the adhesives to the element.

What we claim is:

1. An ink-jet head comprising an ink flow path formed by laminating cured films of photosensitive compositions and an ink discharging orifice, at least the ink discharging orifice region being composed of the cured films.

2. An ink-jet head according to claim 1, wherein said compositions are photosensitive resins.

3. An ink-jet head according to claim 1, wherein said composition is a dry film photoresist.

4. An ink-jet head according to claim 1, wherein said composition is in a form of film having a thickness of 25–100 microns.

5. An ink-jet head according to claim 1, wherein an ink discharging pressure generating element is disposed in said ink flow path.

6. An ink-jet head according to claim 1, wherein said ink flow path is in communication with an ink discharging port.

7. An ink-jet head according to claim 1, wherein a plurality of said ink paths are provided.

8. An ink-jet head having an ink flow path and an ink discharging orifice connected to the ink flow path comprising a substrate having an ink discharge pressure generating element, a first film of a cured photosensitive composition laminated to the substrate with at least the ink discharging pressure generating element is not covered with the first film, a second film of a cured photosensitive composition laminated to the first film and a third film of a cured photosensitive composition laminated to the second film, the first, second and the third films defining the ink flow path and the ink discharging orifice.

9. An ink-jet head according to claim 8, wherein said composition is a photosensitive resin.

10. An ink-jet head according to claim 8, wherein said composition is a dry film photoresist.

11. An ink-jet head according to claim 8, wherein said composition is in a form of film having a thickness of 25–100 microns.

12. An ink-jet head according to claim 8, wherein said ink flow path is defined in a cured resin film.

13. An ink-jet head according to claim 8, wherein an ink discharging pressure generating element is disposed in said ink flow path.

14. An ink-jet head according to claim 8, wherein a plurality of said ink flow paths are provided.

15. A method for fabrication of an ink jet head, which comprises forming a first film of a cured photosensitive resin on a surface of a substrate on which an ink discharge pressure generating element is arranged, producing an ink flow path with a second film of a cured photosensitive resin formed on the first film, disposing a third film of a cured photosensitive resin on the second film, and forming an ink discharging orifice connected to the ink flow path, with the said first, second and third films being composed of cured photosensitive resins.

16. A method as set forth in claim 15, wherein said resin is a dry film photoresist.

17. A method as set forth in claim 15, wherein said resin is in a form of film having thickness of 25–100 microns.

18. A method as set forth in claim 15, wherein an ink discharging pressure generating element is disposed in said ink flow path.

19. A method as set forth in claim 15, wherein a plurality of said ink flow paths are provided.

* * * * *